(12) United States Patent
Fann

(10) Patent No.: US 6,279,828 B1
(45) Date of Patent: Aug. 28, 2001

(54) ONE DIMENSIONAL BAR CODING FOR MULTIBYTE CHARACTER

(76) Inventor: Shawwen Fann, 23860 Killion St., Woodland Hills, CA (US) 91367

( * ) Notice: Subject to any disclaimer, the term of this patent is extended or adjusted under 35 U.S.C. 154(b) by 0 days.

(21) Appl. No.: 09/260,149

(22) Filed: Mar. 1, 1999

(51) Int. Cl.[7] ........................................... G06K 7/10
(52) U.S. Cl. .............................. 235/462.01; 235/494
(58) Field of Search ..................... 235/462.01, 462.07, 235/462.16, 494

(56) References Cited

U.S. PATENT DOCUMENTS

| | | | |
|---|---|---|---|
| 5,304,786 | * 4/1994 | Pavlidis et al. | 235/462.01 |
| 5,337,233 | * 8/1994 | Hofert et al. | 364/419.14 |
| 5,404,003 | * 4/1995 | Smith | 235/462.1 |
| 5,563,399 | * 10/1996 | Wang | 235/462.01 |
| 5,602,382 | * 2/1997 | Ulvr et al. | 235/462.02 |
| 5,939,700 | * 8/1999 | Ackley | 235/462.01 |

FOREIGN PATENT DOCUMENTS 667 592 * 8/1995 (EP) .

* cited by examiner

Primary Examiner—Michael G. Lee
Assistant Examiner—Diane I. Lee
(74) Attorney, Agent, or Firm—Maria Erlinda Co Sarno

(57) ABSTRACT

One dimensional bar code patterns for encoding single and multi-byte characters and method for encoding and decoding these one dimensional bar code patterns using existing bar code readers and scanners. The encoded bar code patterns are generated by base number code systems greater than two with a code length of eight, although longer code lengths are possible. A rule oriented method for generating the one dimensional bar code patterns for both single and multi-byte characters and other rules may be applied to the use of base number code systems greater than two for generating the one dimensional bar code patterns. The rules increase the accuracy of the interpretation and resolvability of the generated bar code patterns.

38 Claims, 22 Drawing Sheets

| Pattern | Ratio | Assigned Base-4 Value |
|---|---|---|
| Bar | 1 | 1 |
| Bar | 2 | 0 |
| Bar | 3 | 0,1 |
| Space | 1 | 2 |
| Space | 2 | 3 |
| Space | 3 | 3, 2 |

| Designated Number | Decimal Equivalent | MB8 Bar Code Pattern | Assigned Value | Assigned Function |
|---|---|---|---|---|
| 03121212 | 13926 | | 0 | 0 |
| 12012012 | 24966 | | 1 | 1 |
| 12012132 | 24990 | | 2 | 2 |
| 12013212 | 25062 | | 3 | 3 |
| 12020212 | 25126 | | 4 | 4 |
| 12021202 | 25186 | | 5 | 5 |
| 12021213 | 25191 | | 6 | 6 |
| 12021312 | 25206 | | 7 | 7 |
| 12031212 | 25446 | | 8 | 8 |
| 12120132 | 26142 | | 9 | 9 |
| 12120202 | 26146 | | 10 | 10 |
| 12120213 | 26151 | | 11 | 11 |
| 12120312 | 26166 | | 12 | 12 |
| 12121203 | 26211 | | 13 | 13 |
| 12121302 | 26226 | | 14 | 14 |
| 12121313 | 26231 | | 15 | 15 |
| 12130212 | 26406 | | 16 | 16 |
| 12131202 | 26466 | | 17 | 17 |
| 12131213 | 26471 | | 18 | 18 |
| 12131312 | 26486 | | 19 | 19 |
| 12132012 | 26502 | | 20 | 20 |
| 12132132 | 26526 | | 21 | 21 |
| 13021212 | 29286 | | 22 | 22 |
| 13120212 | 30246 | | 23 | 23 |
| 13121202 | 30306 | | 24 | 24 |
| 13121213 | 30311 | | 25 | 25 |
| 13121312 | 30326 | | 26 | 26 |
| 13131212 | 30566 | | 27 | 27 |
| 13201212 | 30822 | | 28 | 28 |

Figure 1A

| Designated Number | Decimal Equivalent | MB8 Bar Code Pattern | Assigned Value | Assigned Function |
|---|---|---|---|---|
| 13212012 | 31110 | | 29 | 29 |
| 13212132 | 31134 | | 30 | 30 |
| 13213212 | 31206 | | 31 | 31 |
| 02012012 | 8582 | | 32 | 32 |
| 02012132 | 8606 | | 33 | 33 |
| 02013212 | 8678 | | 34 | 34 |
| 02020212 | 8742 | | 35 | 35 |
| 02021202 | 8802 | | 36 | 36 |
| 02021213 | 8807 | | 37 | 37 |
| 02021312 | 8822 | | 38 | 38 |
| 02031212 | 9062 | | 39 | 39 |
| 02120132 | 9758 | | 40 | 40 |
| 02120202 | 9762 | | 41 | 41 |
| 02120213 | 9767 | | 42 | 42 |
| 02120312 | 9782 | | 43 | 43 |
| 02121203 | 9827 | | 44 | 44 |
| 02121302 | 9842 | | 45 | 45 |
| 02121313 | 9847 | | 46 | 46 |
| 02130212 | 10022 | | 47 | 47 |
| 02131202 | 10082 | | 48 | 48 |
| 02131213 | 10087 | | 49 | 49 |
| 02131312 | 10102 | | 50 | 50 |
| 02132012 | 10118 | | 51 | 51 |
| 02132132 | 10142 | | 52 | 52 |
| 03021212 | 12902 | | 53 | 53 |
| 03120212 | 13862 | | 54 | 54 |
| 03121202 | 13922 | | 55 | 55 |
| 03121213 | 13927 | | 56 | 56 |
| 03121312 | 13942 | | 57 | 57 |

Figure 1B

| Designated Number | Decimal Equivalent | MB8 Bar Code Pattern | Assigned Value | Assigned Function |
|---|---|---|---|---|
| 03131212 | 14182 | | 58 | 58 |
| 03201212 | 14438 | | 59 | 59 |
| 03212012 | 14726 | | 60 | 60 |
| 03212132 | 14750 | | 61 | 61 |
| 03213212 | 14822 | | 62 | 62 |
| 12012013 | 24967 | | 63 | 63 |
| 12012032 | 24974 | | 64 | 64 |
| 12013012 | 25030 | | 65 | 65 |
| 12013132 | 25054 | | 66 | 66 |
| 12013202 | 25058 | | 67 | 67 |
| 12013213 | 25063 | | 68 | 68 |
| 12020132 | 25118 | | 69 | 69 |
| 12020202 | 25122 | | 70 | 70 |
| 12020213 | 25127 | | 71 | 71 |
| 12020312 | 25142 | | 72 | 72 |
| 12021203 | 25187 | | 73 | 73 |
| 12021302 | 25202 | | 74 | 74 |
| 12021313 | 25207 | | 75 | 75 |
| 12030212 | 25382 | | 76 | 76 |
| 12031202 | 25442 | | 77 | 77 |
| 12031213 | 25447 | | 78 | 78 |
| 12031312 | 25462 | | 79 | 79 |
| 12032012 | 25478 | | 80 | 80 |
| 12032132 | 25502 | | 81 | 81 |
| 12120203 | 26147 | | 82 | 82 |
| 12120302 | 26162 | | 83 | 83 |
| 12120313 | 26167 | | 84 | 84 |
| 12121303 | 26227 | | 85 | 85 |
| 12130132 | 26398 | | 86 | 86 |

Figure 1C

| Designated Number | Decimal Equivalent | MB8 Bar Code Pattern | Assigned Value | Assigned Function |
|---|---|---|---|---|
| 12130202 | 26402 | | 87 | 87 |
| 12130213 | 26407 | | 88 | 88 |
| 12130312 | 26422 | | 89 | 89 |
| 12131203 | 26467 | | 90 | 90 |
| 12131302 | 26482 | | 91 | 91 |
| 12131313 | 26487 | | 92 | 92 |
| 12132013 | 26503 | | 93 | 93 |
| 12132032 | 26510 | | 94 | 94 |
| 13012012 | 29062 | | 95 | 95 |
| 13012132 | 29086 | | 96 | 96 |
| 13013212 | 29158 | | 97 | 97 |
| 13020212 | 29222 | | 98 | 98 |
| 13021202 | 29282 | | 99 | 99 |
| 13021213 | 29287 | | 100 | 100 |
| 13021312 | 29302 | | 101 | 101 |
| 13031212 | 29542 | | 102 | 102 |
| 13120132 | 30238 | | 103 | 103 |
| 13120202 | 30242 | | 104 | 104 |
| 13120213 | 30247 | | 105 | 105 |
| 13120312 | 30262 | | 106 | 106 |
| 13121203 | 30307 | | 107 | 107 |
| 13121302 | 30322 | | 108 | 108 |
| 13121313 | 30327 | | 109 | 109 |
| 13130212 | 30502 | | 110 | 110 |
| 13131202 | 30562 | | 111 | 111 |
| 13131213 | 30567 | | 112 | 112 |
| 13131312 | 30582 | | 113 | 113 |
| 13132012 | 30598 | | 114 | 114 |
| 13132132 | 30622 | | 115 | 115 |

Figure 1D

| Designated Number | Decimal Equivalent | MB8 Bar Code Pattern | Assigned Value | Assigned Function |
|---|---|---|---|---|
| 13201202 | 30818 | | 116 | 116 |
| 13201213 | 30823 | | 117 | 117 |
| 13201312 | 30838 | | 118 | 118 |
| 13202012 | 30854 | | 119 | 119 |
| 13202132 | 30878 | | 120 | 120 |
| 13203212 | 30950 | | 121 | 121 |
| 13212013 | 31111 | | 122 | 122 |
| 13212032 | 31118 | | 123 | 123 |
| 13213012 | 31174 | | 124 | 124 |
| 13213132 | 31198 | | 125 | 125 |
| 13213202 | 31202 | | 126 | 126 |
| 02131212 | 10086 | | 127 | 127 |
| 02012032 | 8590 | | 128 | 128 |
| 02013012 | 8646 | | 129 | 129 |
| 02013132 | 8670 | | 130 | 130 |
| 02013202 | 8674 | | 131 | 131 |
| 02013213 | 8679 | | 132 | 132 |
| 02020132 | 8734 | | 133 | 133 |
| 02020202 | 8738 | | 134 | 134 |
| 02020213 | 8743 | | 135 | 135 |
| 02020312 | 8758 | | 136 | 136 |
| 02021203 | 8803 | | 137 | 137 |
| 02021302 | 8818 | | 138 | 138 |
| 02021313 | 8823 | | 139 | 139 |
| 02030212 | 8998 | | 140 | 140 |
| 02031202 | 9058 | | 141 | 141 |
| 02031213 | 9063 | | 142 | 142 |
| 02031312 | 9078 | | 143 | 143 |
| 02032012 | 9094 | | 144 | 144 |

Figure 1E

| Designated Number | Decimal Equivalent | MB8 Bar Code Pattern | Assigned Value | Assigned Function |
|---|---|---|---|---|
| 02032132 | 9118 | | 145 | 145 |
| 02120203 | 9763 | | 146 | 146 |
| 02120302 | 9778 | | 147 | 147 |
| 02120313 | 9783 | | 148 | 148 |
| 02121303 | 9843 | | 149 | 149 |
| 02130132 | 10014 | | 150 | 150 |
| 02130202 | 10018 | | 151 | 151 |
| 02130213 | 10023 | | 152 | 152 |
| 02130312 | 10038 | | 153 | 153 |
| 02131203 | 10083 | | 154 | 154 |
| 02131302 | 10098 | | 155 | 155 |
| 02131313 | 10103 | | 156 | 156 |
| 02132013 | 10119 | | 157 | 157 |
| 02132032 | 10126 | | 158 | 158 |
| 03012012 | 12678 | | 159 | 159 |
| 03012132 | 12702 | | 160 | 160 |
| 03013212 | 12774 | | 161 | 161 |
| 03020212 | 12838 | | 162 | 162 |
| 03021202 | 12898 | | 163 | 163 |
| 03021213 | 12903 | | 164 | 164 |
| 03021312 | 12918 | | 165 | 165 |
| 03031212 | 13158 | | 166 | 166 |
| 03120202 | 13858 | | 167 | 167 |
| 03120213 | 13863 | | 168 | 168 |
| 03120312 | 13878 | | 169 | 169 |
| 03121203 | 13923 | | 170 | 170 |
| 03121302 | 13938 | | 171 | 171 |
| 03121313 | 13943 | | 172 | 172 |
| 03130212 | 14118 | | 173 | 173 |

Figure 1F

| Designated Number | Decimal Equivalent | MB8 Bar Code Pattern | Assigned Value | Assigned Function |
|---|---|---|---|---|
| 03131202 | 14178 | | 174 | 174 |
| 03131213 | 14183 | | 175 | 175 |
| 03131312 | 14198 | | 176 | 176 |
| 03132012 | 14214 | | 177 | 177 |
| 03132132 | 14238 | | 178 | 178 |
| 03201202 | 14434 | | 179 | 179 |
| 03201213 | 14439 | | 180 | 180 |
| 03201312 | 14454 | | 181 | 181 |
| 03202012 | 14470 | | 182 | 182 |
| 03202132 | 14494 | | 183 | 183 |
| 03203212 | 14566 | | 184 | 184 |
| 03212013 | 14727 | | 185 | 185 |
| 03212032 | 14734 | | 186 | 186 |
| 03213012 | 14790 | | 187 | 187 |
| 03213132 | 14814 | | 188 | 188 |
| 03213202 | 14818 | | 189 | 189 |
| 03213213 | 14823 | | 190 | 190 |
| 12013013 | 25031 | | 191 | 191 |
| 12013032 | 25038 | | 192 | 192 |
| 12013203 | 25059 | | 193 | 193 |
| 12020203 | 25123 | | 194 | 194 |
| 12020302 | 25138 | | 195 | 195 |
| 12020313 | 25143 | | 196 | 196 |
| 12021303 | 25203 | | 197 | 197 |
| 12030132 | 25374 | | 198 | 198 |
| 12030202 | 25378 | | 199 | 199 |
| 12030213 | 25383 | | 200 | 200 |
| 12030312 | 25398 | | 201 | 201 |
| 12031203 | 25443 | | 202 | 202 |

Figure 1G

| Designated Number | Decimal Equivalent | MB8 Bar Code Pattern | Assigned Value | Assigned Function |
|---|---|---|---|---|
| 12031302 | 25458 | | 203 | 203 |
| 12031313 | 25463 | | 204 | 204 |
| 12032013 | 25479 | | 205 | 205 |
| 12032032 | 25486 | | 206 | 206 |
| 12120303 | 26163 | | 207 | 207 |
| 12130203 | 26403 | | 208 | 208 |
| 12130302 | 26418 | | 209 | 209 |
| 12130313 | 26423 | | 210 | 210 |
| 12131303 | 26483 | | 211 | 211 |
| 13012013 | 29063 | | 212 | 212 |
| 13012032 | 29070 | | 213 | 213 |
| 13013012 | 29126 | | 214 | 214 |
| 13013132 | 29150 | | 215 | 215 |
| 13013202 | 29154 | | 216 | 216 |
| 13013213 | 29159 | | 217 | 217 |
| 13020132 | 29214 | | 218 | 218 |
| 13020202 | 29218 | | 219 | 219 |
| 13020213 | 29223 | | 220 | 220 |
| 13020312 | 29238 | | 221 | 221 |
| 13021203 | 29283 | | 222 | 222 |
| 13021302 | 29298 | | 223 | 223 |
| 13021313 | 29303 | | 224 | 224 |
| 13030212 | 29478 | | 225 | 225 |
| 13031202 | 29538 | | 226 | 226 |
| 13031213 | 29543 | | 227 | 227 |
| 13031312 | 29558 | | 228 | 228 |
| 13032012 | 29574 | | 229 | 229 |
| 13032132 | 29598 | | 230 | 230 |
| 13120203 | 30243 | | 231 | 231 |

Figure 1H

| Designated Number | Decimal Equivalent | MB8 Bar Code Pattern | Assigned Value | Assigned Function |
|---|---|---|---|---|
| 13120302 | 30258 | | 232 | 232 |
| 13120313 | 30263 | | 233 | 233 |
| 13121303 | 30323 | | 234 | 234 |
| 13130132 | 30494 | | 235 | 235 |
| 13130202 | 30498 | | 236 | 236 |
| 13130213 | 30503 | | 237 | 237 |
| 13130312 | 30518 | | 238 | 238 |
| 13131203 | 30563 | | 239 | 239 |
| 13131302 | 30578 | | 240 | 240 |
| 13131313 | 30583 | | 241 | 241 |
| 13132013 | 30599 | | 242 | 242 |
| 13132032 | 30606 | | 243 | 243 |
| 13201203 | 30819 | | 244 | 244 |
| 13201302 | 30834 | | 245 | 245 |
| 13201313 | 30839 | | 246 | 246 |
| 13202013 | 30855 | | 247 | 247 |
| 13202032 | 30862 | | 248 | 248 |
| 13203012 | 30918 | | 249 | 249 |
| 13203132 | 30942 | | 250 | 250 |
| 13203202 | 30946 | | 251 | 251 |
| 13203213 | 30951 | | 252 | 252 |
| 13213013 | 31175 | | 253 | 253 |
| 13213032 | 31182 | | 254 | 254 |
| 13213203 | 31203 | | 255 | 255 |
| 12121212 | 26214 | | 256 | Command |
| 02121212 | 9830 | | 257 | Reserved |
| 12021212 | 25190 | | 258 | Reserved |
| 12120212 | 26150 | | 259 | Reserved |
| 12121202 | 26210 | | 260 | Reserved |

Figure 1I

| Designated Number | Decimal Equivalent | MB8 Bar Code Pattern | Assigned Value | Assigned Function |
|---|---|---|---|---|
| 12121213 | 26215 | | 261 | Reserved |
| 12121312 | 26230 | | 262 | Reserved |
| 12131212 | 26470 | | 263 | Reserved |
| 13121212 | 30310 | | 264 | Reserved |
| 01201212 | 6246 | | 265 | Reserved |
| 01212012 | 6534 | | 266 | Reserved |
| 01212132 | 6558 | | 267 | Reserved |
| 01213212 | 6630 | | 268 | Reserved |
| 01321212 | 7782 | | 269 | Reserved |
| 02021212 | 8806 | | 270 | Reserved |
| 02120212 | 9766 | | 271 | Reserved |
| 02121202 | 9826 | | 272 | Reserved |
| 02121213 | 9831 | | 273 | Reserved |
| 02121312 | 9846 | | 274 | Reserved |
| 01201202 | 6242 | | 275 | Reserved |
| 01201213 | 6247 | | 276 | Reserved |
| 01201312 | 6262 | | 277 | Reserved |
| 01202012 | 6278 | | 278 | Reserved |
| 01202132 | 6302 | | 279 | Reserved |
| 01203212 | 6374 | | 280 | Reserved |
| 01212013 | 6535 | | 281 | Reserved |
| 01212032 | 6542 | | 282 | Reserved |
| 01213012 | 6598 | | 283 | Reserved |
| 01213132 | 6622 | | 284 | Reserved |
| 01213202 | 6626 | | 285 | Reserved |
| 01213213 | 6631 | | 286 | Reserved |
| 01301212 | 7270 | | 287 | Reserved |
| 01312012 | 7558 | | 288 | Reserved |
| 01312132 | 7582 | | 289 | Reserved |

Figure 1J

| Designated Number | Decimal Equivalent | MB8 Bar Code Pattern | Assigned Value | Assigned Function |
|---|---|---|---|---|
| 01313212 | 7654 | | 290 | Reserved |
| 01320212 | 7718 | | 291 | Reserved |
| 01321202 | 7778 | | 292 | Reserved |
| 01321213 | 7783 | | 293 | Reserved |
| 01321312 | 7798 | | 294 | Reserved |
| 13213213 | 31207 | | 295 | Reserved |
| 01201203 | 6243 | | 296 | Reserved |
| 01201302 | 6258 | | 297 | Reserved |
| 01201313 | 6263 | | 298 | Reserved |
| 01202013 | 6279 | | 299 | Reserved |
| 01202032 | 6286 | | 300 | Reserved |
| 01203012 | 6342 | | 301 | Reserved |
| 01203132 | 6366 | | 302 | Reserved |
| 01203202 | 6370 | | 303 | Reserved |
| 01203213 | 6375 | | 304 | Reserved |
| 01213013 | 6599 | | 305 | Reserved |
| 01213032 | 6606 | | 306 | Reserved |
| 01213203 | 6627 | | 307 | Reserved |
| 01301202 | 7266 | | 308 | Reserved |
| 01301213 | 7271 | | 309 | Reserved |
| 01301312 | 7286 | | 310 | Reserved |
| 01302012 | 7302 | | 311 | Reserved |
| 01302132 | 7326 | | 312 | Reserved |
| 01303212 | 7398 | | 313 | Reserved |
| 01312013 | 7559 | | 314 | Reserved |
| 01312032 | 7566 | | 315 | Reserved |
| 01313012 | 7622 | | 316 | Reserved |
| 01313132 | 7646 | | 317 | Reserved |
| 01313202 | 7650 | | 318 | Reserved |

Figure 1K

| Designated Number | Decimal Equivalent | MB8 Bar Code Pattern | Assigned Value | Assigned Function |
|---|---|---|---|---|
| 01313213 | 7655 | ■ ▪ ▪ | 319 | Reserved |
| 01320132 | 7710 | ■ ■ | 320 | Reserved |
| 01320202 | 7714 | ■ ■ ▪ | 321 | Reserved |
| 01320213 | 7719 | ■ ■ ▪ | 322 | Reserved |
| 01320312 | 7734 | ■ ■ ▪ | 323 | Reserved |
| 01321203 | 7779 | ■ ▪ ■ | 324 | Reserved |
| 01321302 | 7794 | ■ ▪ ■ | 325 | Reserved |
| 01321313 | 7799 | ■ ▪ ▪ | 326 | Reserved |
| 02012013 | 8583 | ■ ■ ■ | 327 | Reserved |
| 03120132 | 13854 | ■ ▪ ■ | 328 | START |
| 02012130 | 8604 | ■ ■ ▪ ■ | 329 | STOP |

Figure 1L

| Pattern | Ratio | Assigned Base-4 Value |
|---|---|---|
| Bar | 1 | 1 |
| Bar | 2 | 0 |
| Bar | 3 | 0,1 |
| Space | 1 | 2 |
| Space | 2 | 3 |
| Space | 3 | 3, 2 |

Figure 2

Multibyte Character A5CD(Hexdecimal)

In Code Page 950 Traditional Chinese "LIFE" ⇒

In Code Page 936 Simplified Chinese ⇒

| Command Word | Designated ANSI Code Page |
|---|---|
| 0 | Reserved |
| 1 | 936, Simplified Chinese(People's Republic of China) |
| 2 | 949, Korean |
| 3 | 950, Traditional Chinese(Taiwan) |
| 4 | 932, Japanese |
| 5-327 | Reserved |

Figure 11

ONE DIMENSIONAL BAR CODING FOR MULTIBYTE CHARACTER

BACKGROUND

Bar coding has become an integral part of routine commercial transaction since it was introduced in the seventies because the system allows users to process detailed information at the moment the bar code is read rather than simply storing information for later processing. Further, bar codes are visible, typically printed directly on an object or on labels that are affixed to the object. Bar code and bar code patterns are used interchangeably herein. One dimensional and sometimes, two dimensional bar codes are now used to track a vast range of information on products and services.

The bar coding technology has become reliable and mature. However, despite its technological advancement, present one dimensional bar codes are only capable of representing single byte character sets such as the English alphabet and the Arabic numbers because current bar code systems are not capable of unambiguously encoding the full 256 ($2^8$) bar code patterns. For example, code system Code 128 encodes only 106 complete characters in the American Standard Code for Information Interchange (ASCII) 8-bit format. A bar code system is a fixed definition of the mapping between a bar pattern and its corresponding numerical value, herein referred to as decimal. Currently, 128 ASCII characters have been found to be sufficient in encoding the English alphabet, usual punctuation, special characters and the Arabic numbers, however, this is not enough to encode other character sets such as the foreign language characters, which are multi-byte rather than single byte. This need to encode and represent foreign character sets are currently addressed by using a two dimensional bar code which are, however, not readable with most conventional bar code readers because these read only one dimensional bar code patterns. Conventional one dimensional bar code patterns typically comprise of a series of bars and spaces, referred collectively herein as images, the combination of these representing strings of binary ones and zeros. These patterns which are translated in machine readable language are used for entering data into a computer system for processing.

A bar code system implementation usually has a Bar Code Generator and a Bar Code Reader. A user inputs the data and a program within the Bar Code Generator sends and designates the bar code system for encoding the data to the appropriate encoder. Data as used herein encompass a full range of letters, English and Foreign, numbers, words, text, and symbol items one may desire to communicate. The encoder converts the data to a bar code and sends this to a generator which generates the black and white bar images or pattern for the bar code printer. Physically, the Bar Code Generator is usually made up of a computer and a printer. Depending on one's system configuration, the encoder and generator may be incorporated with the bar code printer or with the computer system. The generated bar code patterns are detected or read by a Bar Code Reader which comprise a scanner and a decoder. Examples of Bar Code Readers are scanning laser beams or handheld wands which electro-optically decode the bar code pattern to its corresponding decimal which by the use of a look up table, correlates this to a given character value, herein referred to as assigned value having an assigned function, resulting in a decoder output signal representative of the originally inputted data.

It is an object of this invention to provide a bar code system that can generate one dimensional bar code patterns for encoding both a single byte and a multi-byte character set.

It is an object of this invention to provide one dimensional bar code patterns for encoding multi-byte character sets such as the foreign language characters.

It is also an object of this invention to provide a method for decoding bar patterns representing multi-byte characters using conventional one dimensional bar code readers.

It is a further object of this invention to provide a bar code generator utilizing a bar code system capable of encoding multi-byte characters.

It is still a further object of this invention to provide a method for using conventional one dimensional bar code reader for decoding bar code patterns generated by base numbers greater than two.

SUMMARY OF THE INVENTION

The invention relates to a one dimensional bar code structure of bars and spaces comprising a start, stop, command, checksum and data bar code patterns representing single byte and multi-byte character string, the bar code patterns within the bar code structure generated preferably from a base-4 number code system, however, any base code system greater than two can be adopted. However, a base number code system of 32 and greater would be too complex and impractical to use. A string is a single or multiple characters in a series. A bar code system implementation uses the generated one dimensional bar code patterns to encode both single and multi-byte characters, and decode these with any bar code reader that is capable of differentiating a space from a bar image. Not all generated bar code patterns are used. Certain rules are proposed and disclosed in selecting the set of bar code patterns. The proposed coding system herein codes foreign characters that meet the requirements of the uni-code standard.

The preferred base number coding system uses the base-4 numbers with designated base numbers 0,1,2 and 3, having a code length of 8. A code length herein is the number of digits of designated base numbers within a code system for encoding a data into a bar code pattern. In a given base number coding system of less than 32, the individual numbers within the chosen base number such as 0,1,2,3 in the base-4 number code system are herein referred to as designated base number or designated base numbers. The grouping or combination of these individual numbers or digits of designated base numbers in a chosen code length such as 8 in the example used herein, is referred to as designated number. A given designated number consisting of 8 digits of a base-4 number may also be specifically referred to herein as 8-digit base-4 number. Code lengths greater than eight may be used but code lengths greater than sixteen would generate bar code patterns that are too long and difficult to handle. On the coding system, any base number coding system of less than 32 may be used so long as the resulting bar codes have images with widths no greater than three units. The width of the individual bars and spaces or image is measured in units and correspond to the number of units of bars and spaces making up the image. For example, three units of bars will have a width of three. A unit is the width of the smallest image obtained by measuring and comparing the individual bar and space images within a reference bar code pattern. Although base-4 number code system having a code length of 8 is used as the example and demonstrated in detail for encoding single and multi-byte characters, the concept, teachings and processes shown for the base-4 number code system also apply to the other base number code systems with code lengths of eight to sixteen. Unique to this invention is the ability to utilize and unambiguously assign the full 256 bar code patterns needed to encode most foreign character sets by using base number code systems greater than two. The combination of these designated base numbers can generate all the possible bar image patterns desired for both single and multi-byte character sets. A base-4 numbering system with a code length of 8 theoretically can generate 65,536 ($4^8$=65,536) possible patterns which is the same as a 16-bit binary system ($2^{16}$). A method for generating one dimensional bar code patterns having images of bar and space derived from a base number code system of greater than two used for encoding single byte and multi-byte characters, the base number code system having designated base numbers, comprise the steps of: choosing the base number code system; picking a code length between eight and sixteen for the chosen base number code system; generating all combination of the designated base numbers within the chosen base number code system having the chosen code length; assigning an image having a width measured in unit for each designated base number within the chosen base number code system; translating each designated base number within the chosen base number code system according to the assigned image thereby forming a bar code pattern; and, selecting unambiguously decodable generated bar code patterns. One can use any means for selecting which bar code patterns to use. However, in the example illustrated, selecting unambiguously decodable bar code patterns, means any one, combination of or preferably all of the following sub-processes: keeping bar code patterns having images of three units or less; decoding the translated bar code patterns having images of three units or less back to the designated base numbers within the chosen base number code system using the same image assignment for the designated base numbers; and, isolating bar code patterns translating back to the generated combination of designated base number within the chosen bar code system after the decoding step above. The number of selected bar code patterns may be further narrowed to enhance reliability by choosing the bar patterns having a total bar pattern length of no more than 12; selecting bar patterns starting with a bar and ending with a space; assigning to a start bar code pattern, a bar code pattern having a full width combination of one, two and three; picking a stop bar code pattern starting with a bar and ending with a bar from an unselected set of bar patterns, the stop bar code pattern preferably having a total combination of seven bars and spaces with a full width combination of 1, 2 or 3; designating a command code pattern to a bar pattern having a total bar or space width of eight; and, assigning a value and a function for each of all selected bar code patterns.

The encoding process using the different sets of generated bar code patterns are the same for all base number code systems. The method for encoding a single and multi-byte character comprise the steps of: preparing a look-up table having correlating columns of the chosen generated bar code patterns, the designated numbers corresponding to the bar code patterns, decimal equivalent of the designated numbers coding the bar code pattern, assigned values for each bar code pattern and assigned functions for each bar code pattern; inputting a data for encoding; using the look-up table, processing a byte value obtained from the inputted data to an assigned value, correlating the assigned value to an assigned function and decimal equivalent; and, selecting a bar code pattern corresponding to the decimal equivalent.

The decoding process after a generated bar code pattern is scanned and read is a reverse of the encoding process. The bar code pattern is translated back to a designated number of a chosen base number code system using the same image assignment used for generating the bar code patterns. The designated number is converted to its decimal equivalent value which is correlated to the assigned value and assigned function using the look-up table generated for the encoding process. The assigned function is then converted to a character set. For the designated number, an 8-digit base-4 number, the decoding process use the same image assignment rules of 2 bars for 0, one bar for 1, 1 space for 2, 2 spaces for 3, 3 bars for 0,1 and 3 spaces for 3,2.

The bar code structure, the general arrangement of bar patterns chosen, comprises a start, stop, checksum and data bar code patterns. Bar code structure, bar pattern, one dimensional bar code or bar code, are all used synonymously, herein. A command code pattern and a command word, together referred to as command code sequence, may be inserted between the start and the checksum pattern. The command code sequence is used herein to assign the inputted data to a particular set of foreign character, known in the art as code page. If encoding is restricted to a particular code page, the command code sequence is not necessary. A checksum is a code pattern used for error detection in the reading of the bar code structure. The checksum used for the base-4 number code system having a code length of eight is modulus 328. The bar code patterns within a bar code structure are generated from the same chosen base number code system.

The method of using a base-4 numbering system for producing a one dimensional bar code for bar coding single and multi-byte characters comprise the steps of inputting a single or multi-byte character data string into a bar code generator; processing the inputted data into an encoder operating on the same base number code system; generating a one dimensional bar code pattern corresponding to the inputted data; printing the one dimensional bar code on a substrate media; reading the one dimensional bar code with a scanner; decoding the one dimensional bar code structure into the same base number code system used for encoding the bar code structure; and, communicating the identity of the inputted single or multi-byte character data. If the bar code system implementation have a selection of different code page, then a further step of assigning the inputted data to a code page is usually done before processing the inputted data.

BRIEF DESCRIPTION OF THE DRAWING

FIGS. 1A–1L is a table showing the MB8 bar code patterns, the designated number, an 8 digit base-4 numbers coding the patterns, the decimal equivalent value and corresponding assigned value and assigned function in correlating columns.

FIG. 2 is a table showing the image and width ratio assignments for the base-4 numbers used for the individual bar/space encoding and decoding rules.

FIG. 11 is a table showing the command word for the designated ANSI Code Page.

DETAILED DESCRIPTION OF THE INVENTION

Figure 3:
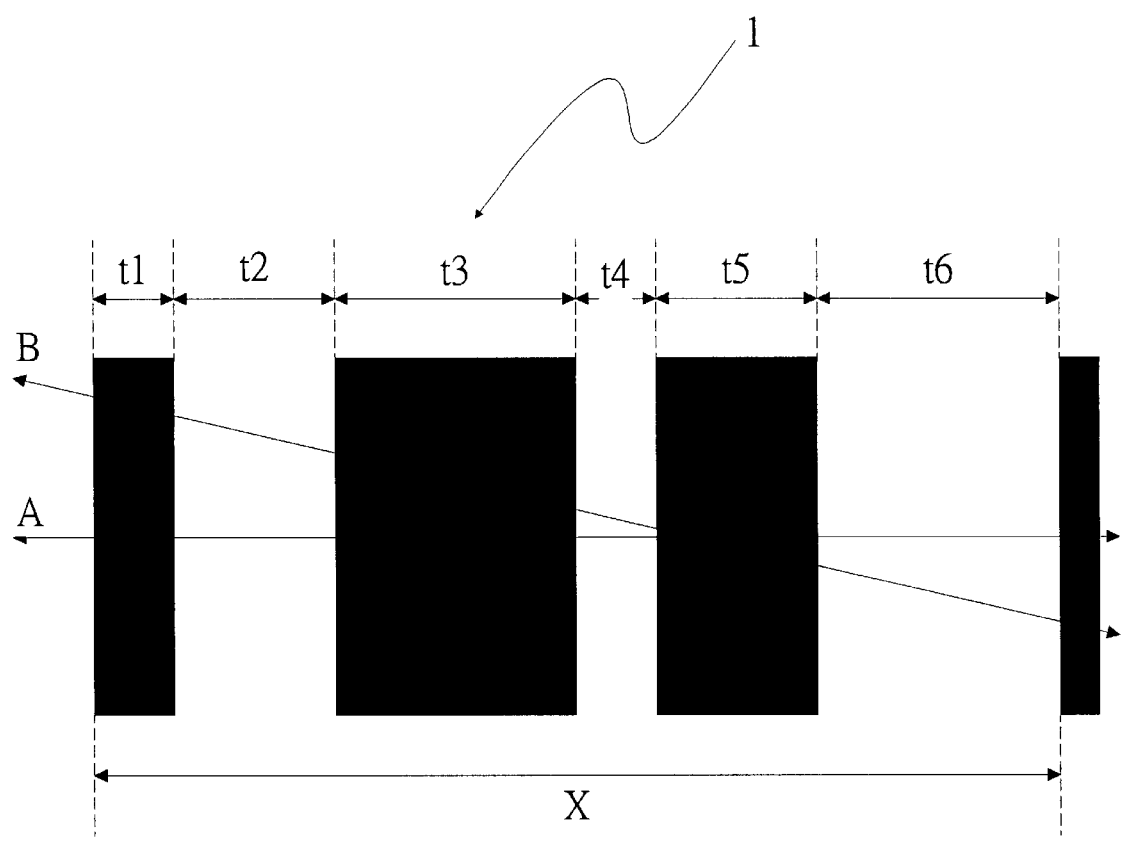
FIG. 3 illustrate a one dimensional bar code and how the width of each bar and space images are measured.

Conventional one dimensional bar code systems representing ASCII character sets are insufficient for coding multi-byte foreign character sets such as Chinese, Kanji, Katakana, Hiragana, Korean, Sanskrit, Pali etc. The above code systems are only sufficient to code the English alphabet, Roman numerals, punctuation and some special characters. Foreign language character sets generally have more than 256 characters which can not be accommodated within the range of an 8-bit (1 byte) number. At present, in order to code these foreign language character sets, two dimensional bar codes are used. Two dimensional bar codes, however, are more complicated in representation, more prone to error in reading and generally can not be read by scanners designed for one dimensional bar codes which covers the majority of the present bar code readers. Three dimensional bar codes are also being developed to encode multi-byte characters but like the two dimensional bar codes, these are also unreadable by conventional scanners. The invention demonstrate herein, the use of a base-4 to base 32 number code system, using the base-4 number code system for illustration, in coding single and multi-byte character sets into a one dimensional bar code which can be read by conventional bar code readers.

Bar Coding With Base-4 Numbering Code System

The base-4 numbering code system is named herein as MB8. The code system utilize all base-4 numbers for coding which are: 0, 1,2 and 3. The grouping of these numbers within a base code system used for coding are referred to as designated numbers. Using these designated numbers, the system is capable of encoding ($4^8$) or 65,536 possible characters or patterns. However, to increase coding and decoding reliability and accuracy, only a fraction of these possible bar code patterns are selected for use. The selection process is rule based and comprise several sub-processes which need not all be performed to code single byte and multi-byte characters in a one dimensional bar code. Performing all of the sub-processes which are applications of the rules of selection proposed herein, will however, result in not only an accurate but also a simple process for encoding the characters. However, it is emphasized that this set of rules are arbitrary, that is, another set of rules can be used on the same base-4 numbering system and still achieve the same results or goal. The proposed rules illustrate just one means of the many ways one can use the base-4 numbering system. A total of 330 bar code patterns from the possible 65,536 bar code patterns are obtained after all the proposed steps or processes herein are taken. These consist of 256 bar code patterns representing the whole range of the numerical value of an 8-bit (a byte) number plus a stop, start, command and some bar code patterns with reserved functions. The bar code pattern representing single and multi-byte character sets are referred to as data bar code patterns to distinguish these from the other bar code patterns representing the command, start, stop functions, etc. The process for generating base-4 number derived one dimensional bar code patterns for encoding single and multi-byte characters comprise the steps of choosing a code length for the base-4 number code system; generating all combinations of base-4 numbers having the chosen code length, herein eight; assigning an image having a width measured in unit for each base-4 number; translating each base-4 numbers according to the assigned image forming a bar code pattern; and, selecting the bar code patterns that are unambiguously decodable. The generated bar code patterns for the base-4 numbers having designated base numbers of 0,1,2 and 3 are shown in FIGS. 1A–1L FIGS. 1A–1L show a table in correlating columns, the designated number, an 8-digit base-4 number, the Decimal Equivalent which is the 16-bit binary decimal equivalent of the base-4 number, the selected base-4 number generated MB8 Bar Code Pattern, the Assigned Value and Assigned Function. This table serves as a look-up table for fetching data from one correlating column to the other. Correlating columns mean the data in the same horizontal row correspond to each other, for example, as shown in FIG. 1J, base number 12121212 has a corresponding decimal equivalent value of 26214, a bar code pattern of alternating bar and spaces of one unit each, an assigned value of 256 and an assigned function of Command. The decimal equivalent is the 16 bits value or word representing the 8 digit base-4 number because each base-4 number correspond or is represented by two bits in a binary system. The computer uses the decimal equivalent in searching for the assigned value and assigned function which are arbitrarily set or vice-versa. The assigned value may be used as the index of the table.

The following enumerate and discuss the proposed rules which are not in the order of importance or sequence. The first rule as shown in FIGS. 1A–1L is to limit the code length of the base-4 numbers to 8 digits even if code lengths of greater than 8 can be used. Second, assign the base-4 numbers herein to the following bar and space images which are 2 bars for 0, one bar for 1, 1 space for 2 and 2 spaces for 3, 3 bars for 0,1 and 3 spaces for 3,2. as shown in FIGS. 1A–1L and 2. These assignments are arbitrary, any permutation of the image assignments will result with the same bar code patterns so long as the same proposed rules for selection are followed. However, identical bar code patterns generated using a different image assignment for the designated base-4 numbers from that shown above, will necessarily result in a different 8 digit base-4 number combination. The assigned value, on the other hand, may or may not be the same as shown herein since the latter is arbitrarily assigned and is usually matched with the given byte value of the inputted data. Third, limit the width 1 of the bar or space patterns in the bar code to 1,2, or 3 units. The bar and space are referred collectively as images. The width 1 of the images is measured from edge to edge as depicted by t1 to t6 in FIG. 3. The widths of the images are being limited herein, because as the width of the image increases, the difference between one width compared to the next succeeding or preceding width 1 becomes less and less. Therefore, if there is imperfection such as a void in the printing of the bars, one bar image may be mistaken for another. The following illustrates this: A width of two compared to a width of one is easily detected because the width of two is 100% more than a width of one. A width of three compared to a width of two is still easily detectable because the width of three is 50% more than the width of two. A width of four when compared to a width of three, its difference is 33%. For a width of five compared to a width of four, the difference is 25% and for a width of seven compared to a width of six, the difference is 17% and so on. As the difference in width between one pattern to the other decreases, the accuracy of detection is compromised, therefore, for maximum detectability, a width of no greater than three is preferably used, although greater widths will still work. Fourth, for optimum resolution and accuracy, always designate width 1 (one) to a single bar or a single space; width 2 (two) to a double bar or a double space and not a combination of two single bars or two single spaces; width 3 three to a double bar followed by a single bar or a double space followed by a single space and not a single bar followed by a double bar or a single space followed by a double space. Fifth, selecting only the bar code patterns that decode back to the original base-4 number when the bar code patterns are decoded using the same image assignment. This means that the designated number generated by the decoder is the same as the original designated number that generated the bar pattern. Sixth, choose only the bar code patterns having a length of no more than 12 units. Seventh, start each code with a bar and ends with a space except for the stop pattern which begins with a bar and ends with a bar as shown in FIG. 1A–1L. The stop pattern chosen is preferably one having a total combination of seven bars and spaces with a full width combination of 1,2 and 3. Fixing the stop pattern this way guarantees that the maximum width of the bar and spaces on the different bar patterns are kept at three with any combination of base-4 numbers used to encode the inputted data. Further, starting and ending with a bar gives a clear definition of the end of a bar pattern structure and ensures that the decoding process does not terminate on a partial bar or space. This also allows reading the bar code structure in any direction, that is, starting from either left or right. Eight, assigning to a start bar code pattern, one having a full width combination of 1,2, and 3 and ninth, designating a bar code pattern having a total bar and space width of eight to the command code pattern.

Encoding Using A Base-4 Number

The method of encoding a single and multi-byte character using as example, base-4 numbers of a code length of eight, comprise the steps of preparing a look-up table as shown in FIGS. 1A–1L having correlating columns for the based number generated bar code patterns (MB8 Bar Code Pattern), the Designated Number, an 8-digit base-4 number, the Decimal Equivalent, their Assigned Value and Assigned Function; inputting a data to be encoded; using the look-up table, processing a byte value obtained from the inputted data to an assigned value, correlating the assigned value to the assigned function and decimal equivalent, translating the decimal equivalent to a Designated Number, an 8-digit base-4 number or a multiple of an 8-digit base-4 number; and, selecting a bar code pattern corresponding to the decimal equivalent of the Designated Number Designated Number and 8-digit base-4 number may be interchangeably used in the bar coding using the Base-4 Numbering Code System. The translation step above is transparent to the user because this is done automatically by the computer. Data as used herein encompass a full range of letters, English and Foreign, numbers, words, text, and symbol items one may desire to communicate. An inputted data generates a byte value from a designated code system or code page using a binary system of representation which is given a corresponding assigned value from the table shown in FIGS. 1A–1L. The assigned value, serving as an index, fetches the assigned function and the decimal equivalent of the 8-digit base-4 number from the look-up table. The assigned value, herein, is arbitrarily given the same value as the byte value of the inputted data. The 8 digit base-4 number is then converted to their assigned images, the base-4 generated MB8 bar code patterns from the look-up table which are then printed to a suitable substrate media.

Figure 4:
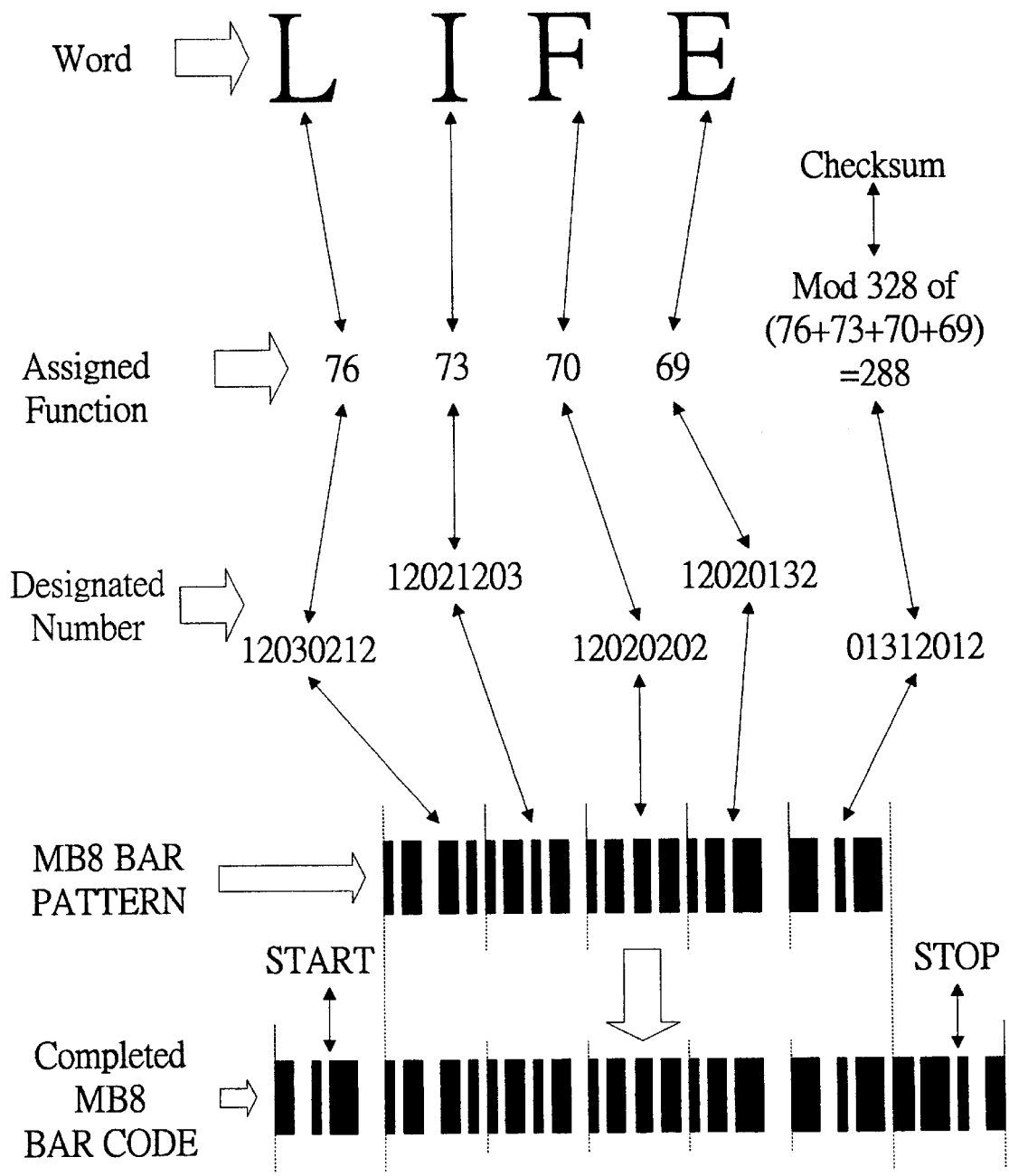
FIG. 4 is a pictorial representation of a sequence for encoding an English word into a scannable one dimensional bar code.
Figure 5:
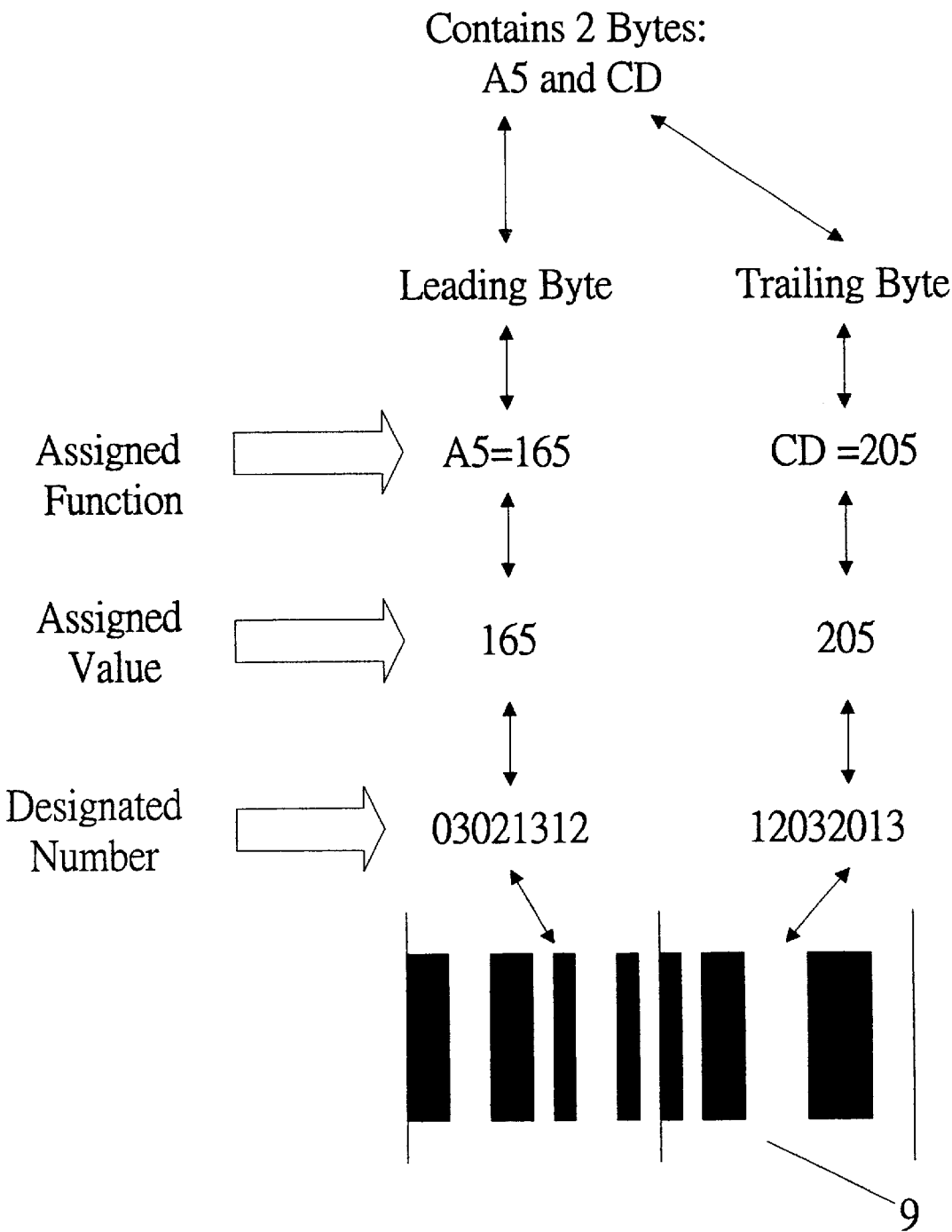
FIG. 5 is a pictorial representation of a sequence for encoding a Chinese character into a scannable one dimensional bar code.
Figure 5A:
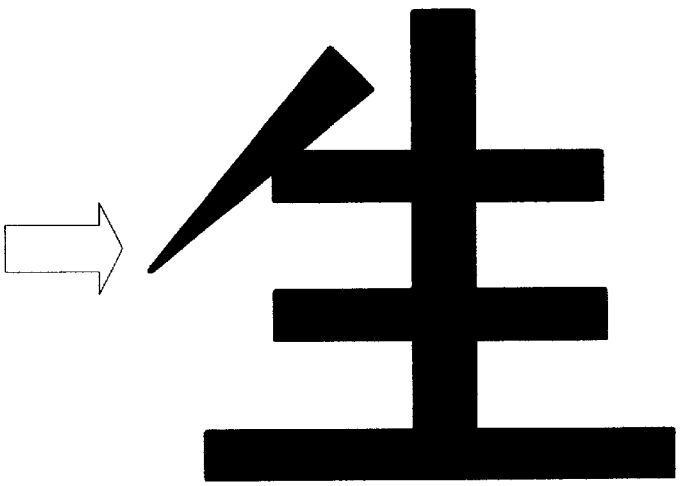
FIG. 5A is the traditional Chinese character for the word Life in Code Page 950.
Figure 5B:
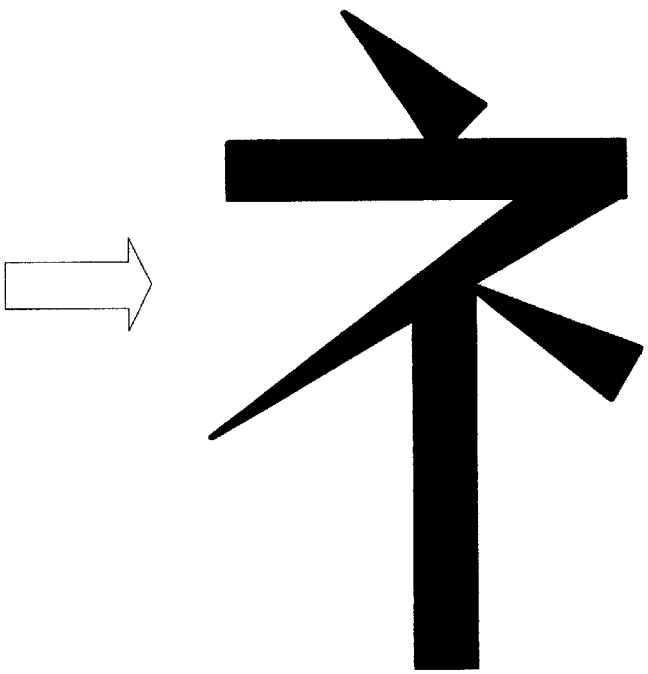
FIG. 5B is the simplified Chinese character for the word Life in Code Page 936.

Encoding a multi-byte character, usually a double byte with a one dimensional bar code, is done one byte at a time, first encoding a leading byte followed by a trailing byte using the process of translation from a binary system to this MB8 code system shown above. To further illustrate the encoding process, FIGS. 4 and 5 show the sequence in encoding a given word: LIFE, using the proposed base-4 numbering code system (MB8) using the English alphabet (FIG. 4) and in traditional or simplified Chinese character (FIGS. 5, 5A, 5B). Inputting the word LIFE spelled with the English character set as shown in FIG. 4 into a Bar Code Generator shown in FIG. 6, will generate an ASCII equivalent byte value for each character such as 76 for the letter L, 73 for the letter I and so forth until all the characters are given their corresponding byte values. These byte values are given an assigned value which herein is arbitrarily made numerically the same as the byte value by an encoder program within a bar code system implementation, the program derived from the look-up table. A program as used herein is any operation using any of the processes disclosed in the use of base-4 numbers or other chosen base numbers for encoding and decoding single and multi-byte characters. As stated above, the assigned value is used as the index into the look-up table shown in FIGS. 1A–1L for fetching the decimal equivalent corresponding to the 8-digit base-4 designated number which then dictates the bar code pattern using the image assignments shown in FIG. 2. The encoder program sends the bar code pattern to the generator 3 which sends it to a printer 4 for printing.

Figure 6:
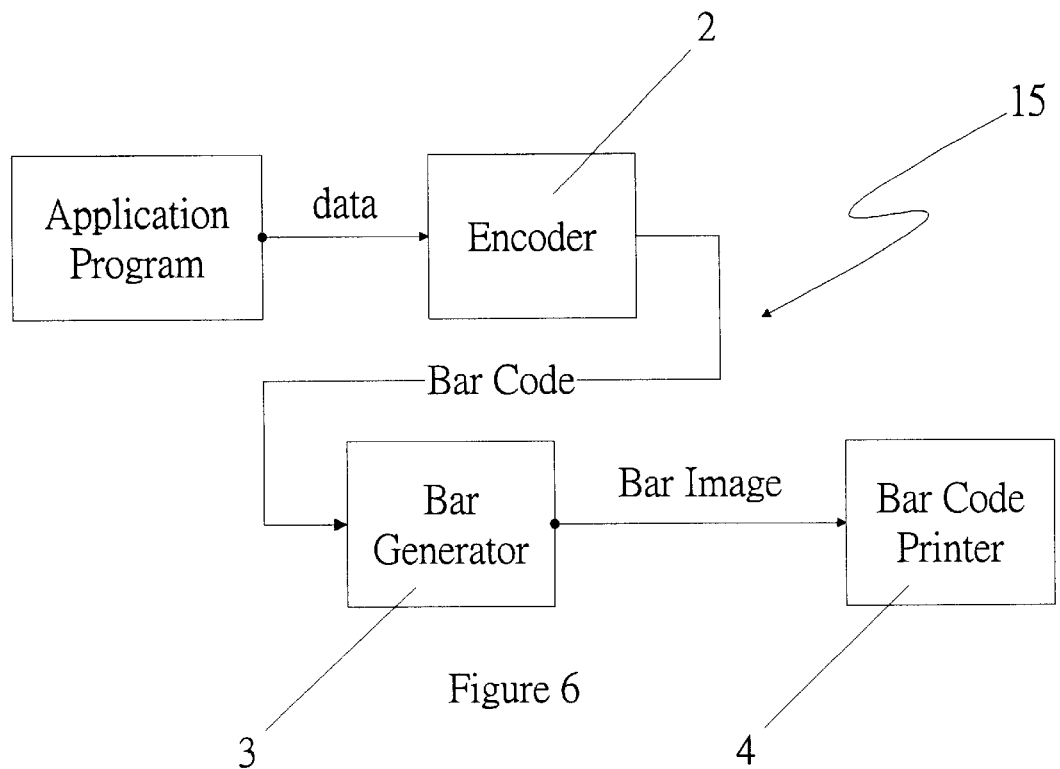
FIG. 6 is a block diagram of the general components of a typical bar code generator.

In encoding the word Life in Chinese character as shown in FIG. 5, the user inputs into a bar code generating system shown in FIG. 6, the word Life and designates the code page for processing the data such as in simplified or traditional Chinese. An encoder program of the bar code generating system, will give the corresponding code or byte value for the inputted word. The word Life, in traditional Chinese character, corresponds to the multi-byte hexadecimal code, A5 CD. The encoder 2 takes the leading byte A5, searches through the look-up table of bar code patterns generated by the MB8 code system shown in FIGS. 1A–1L to find the corresponding assigned value. In this table, A5 has an assigned value of 165 which is numerically the same as the decimal value of 165 for A5. The encoder 2 having the program for processing the data, then takes this assigned value as an index to search for the corresponding 8-digit base-4 designated number and the corresponding bar pattern from the look-up table in the same manner used for encoding LIFE in English character. The encoder 2 sends this bar code pattern to the generator 3 and printer 4. The encoder 2 then takes the trailing byte CD and repeats the process as above. CD in this case also has the same decimal and assigned value of 205 as shown in the look-up table.

The bar code generator system 15 discriminates a single byte from a multi-byte character input by the byte value obtained after reading the first or leading byte. If the first byte value is 127 or less, the input is a single byte character. In this case, the encoder 2 does not wait for a trailing byte and proceeds to process the byte value to the base-4 number generated bar code pattern.

Decoding A Base-4 Number Generated Bar Code Pattern

The decoding process, reverting the bar code pattern back to the corresponding single or multi-byte character, is the reverse of the encoding process. The decoding process comprise the steps of scanning a bar code pattern; translating the bar code pattern to a base-4 number having a decimal equivalent using an image assignment rule; fetching an assigned value correlating to the decimal equivalent from a table; determining an assigned function from the assigned value; and, converting the assigned function to a character set.

Figure 7:
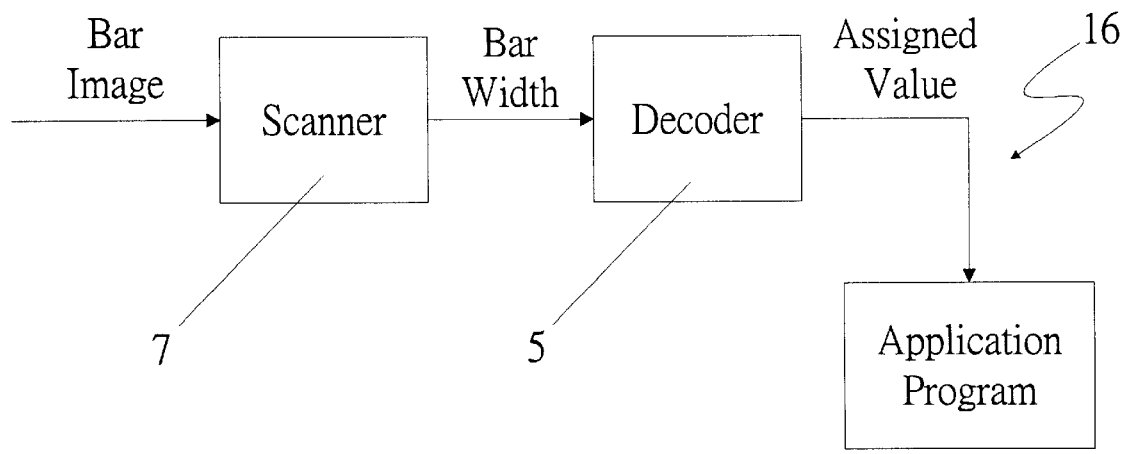
FIG. 7 is a block diagram of the general components of a typical bar code reader.
Figure 8:
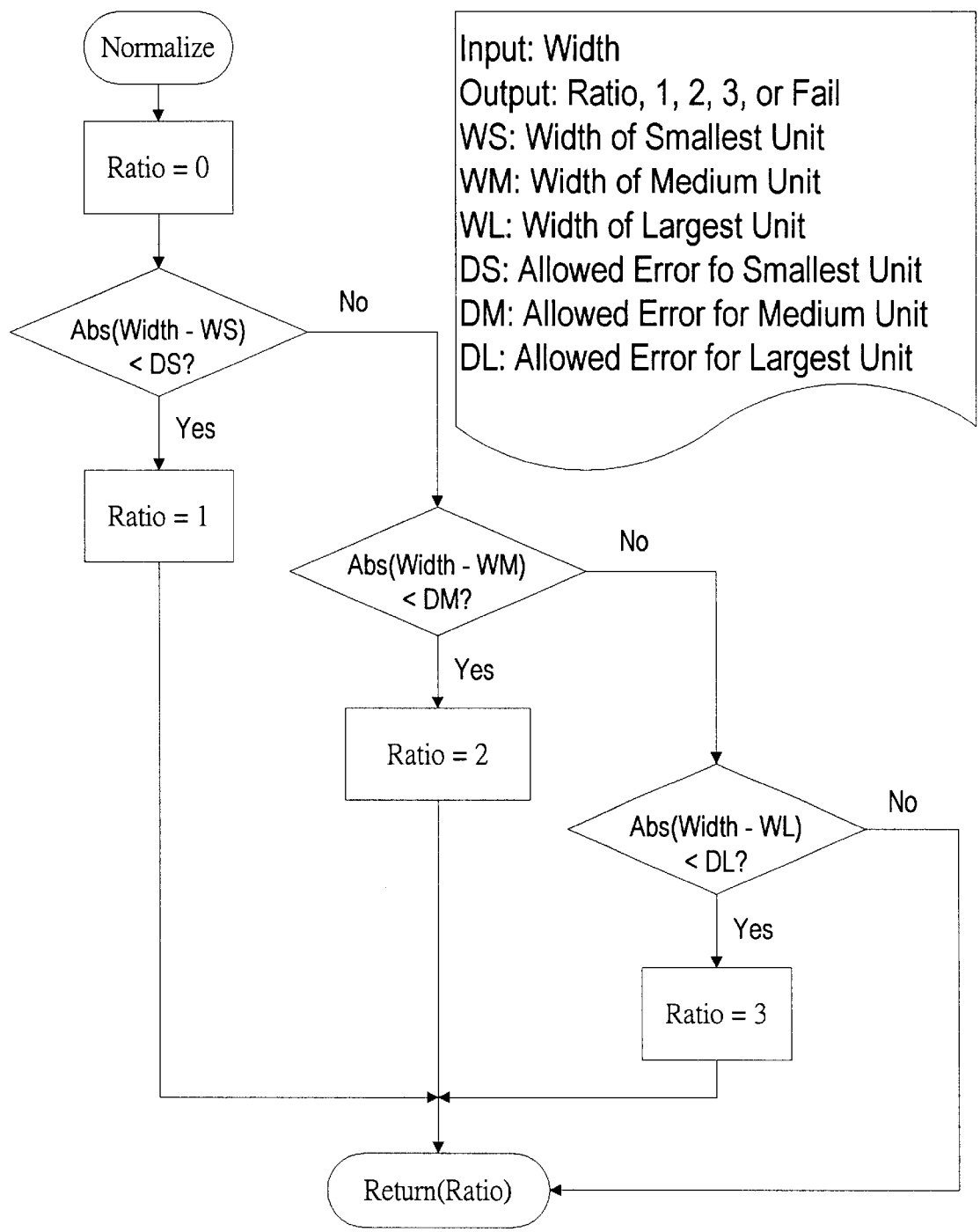
FIG. 8 is a flow diagram showing the normalization of the widths within a bar code pattern.
Figure 9:
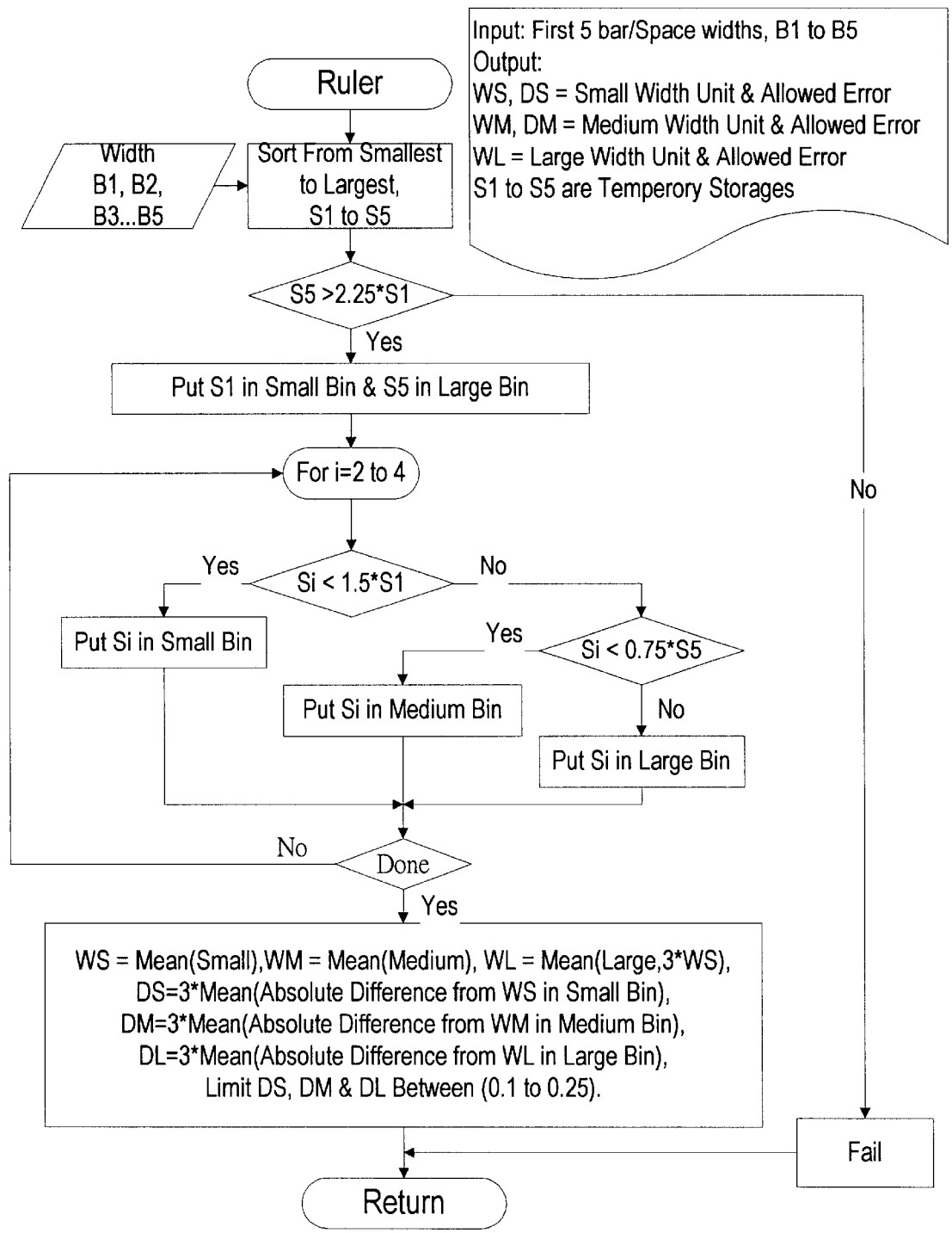
FIG. 9 is a flow diagram showing how the width standards are established for the MB8 coding system.

FIG. 7 is a block diagram of the general components of a bar code decoding system. The scanned bar code patterns contains a series of bar and space images of varying widths. These images are translated to the corresponding base-4 numbers using the same image assignment used for encoding the numbers which are arbitrarily set. The assignment rule set here for the base-4 number code system, as an example, is 2 bars for 0, one bar for 1, 1 space for 2, 2 spaces for 3, 3 bars for 0,1 and 3 spaces for 3,2. As stated above, the set of rules shown in FIG. 2 may be changed. For example, a change in the assignment of bar code pattern for 3, from 3 as a combination of 1 and 2 to 3 as a combination of 2 and 1, will still result in the same amount of bar code patterns. The only difference is that the same bar pattern would be represented by a different combination of base-4 number. To illustrate this, the bar pattern represented in FIG. 3 will be decoded into a base-4 number of 13012032 using the proposed rules herein. If, however, the same bar pattern is read wherein 3 is a combination of 2 and 1 instead of 1 and 2, FIG. 3 will be decoded into a base-4 number of 13102103, instead. Other set of rules can be established in the use of the base-4 numbers or on the other base numbers greater than two and still come up with a system for coding both single and multi-byte characters on a one dimensional bar code pattern. The width of each image is measured from edge to edge as shown by t1 through t6 in FIG. 3. The ratio between each measurement, for example between t1 and t2, remains the same regardless of how they were scanned, as shown by either ray A or ray B. In the normalization of the widths shown in FIG. 8, the decoder 5 measures the bar widths of the bars and spaces found in either the start or stop bar pattern. The smallest width will be designated as one unit or one width, designated as W1 in FIG. 8. Subsequent bar code patterns will then be compared to the smallest width unit of one or width one derived from the start/stop pattern. If the width of the subsequent image matches the width of the smallest width unit of one derived from the start/stop bar code pattern, the bar pattern is also one unit or one width either as a unit of space or a unit of bar. If the width is greater than one width or one unit, the widths are compared and if the width of the image is twice the width +/− an allowed error of the smallest unit of one, then the width is two, if it is thrice +/− allowed error of the smallest width unit of one, then the width is three. Bar code patterns with widths greater than three would be discarded if the limiting rules set herein is applied in the generation of the bar code patterns. FIG. 9 shows the flow diagram on how the width standards is established for the MB8 coding system using the start/stop pattern. As shown in FIG. 9, the bar or space widths in a bar code pattern are first sorted from the smallest to the largest. If the largest width image is greater than 2.25 times the smallest width image, it is further processed, otherwise, the pattern is rejected. The smallest width image is placed in the Small Bin and the largest width image is placed in the Large Bin. The other bar and space width image is then analyzed. If the next image has a width less than 1.5 of the smallest width image, then it is also placed on the Small Bin, otherwise, it is further analyzed. If this image is less than 0.75 of the largest width image, then it goes to Medium Bin, otherwise, it goes to the Large Bin. This process is repeated until the whole bar code structure has been read. Images in the Small Bin have a width of one unit, those in Medium Bin have a width of two units and those in the Large Bin have a width of three units. After scanning and translation of the images to the base-4 numbers, a decoder 5 first interprets the first byte of the 8-digit base-4 number. If the first byte is not a high byte value, that is, an assigned value less than 128, there will be no subsequent second byte. In this case, the decoder 5 immediately proceeds to search through a table of bar code patterns such as that shown in FIGS. 1A–1L and gets the assigned value and assigned function. If the first byte of the 8-digit base-4 number is a high byte value, an assigned value greater than 128, the decoder 5 interprets the first byte as a leading byte, such A5 shown in FIG. 5, and then waits for a trailing byte, such as CD shown in FIG. 5. The decoder 5 combines both bytes, interprets the combination and assign to this an assigned function which represents a multi-byte character. Once the assigned function is obtained, this information is fed to a program which communicates the original inputted data to the user. The decoding process may be the same or different from the program used for encoding the inputted data.

The Bar Code Structure

Figure 10:
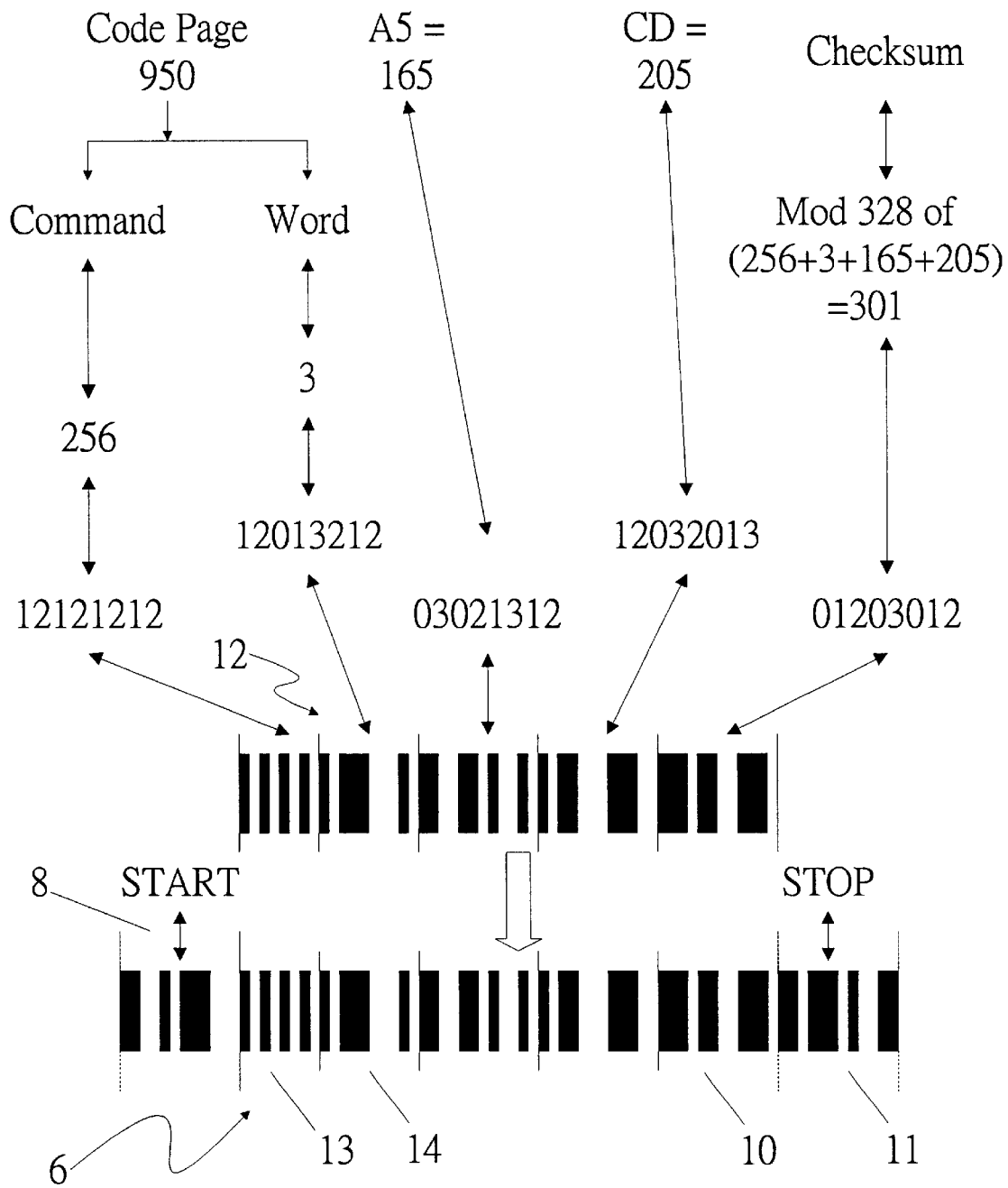
FIG. 10 is an example of a complete bar code pattern structure having base-4 number generated bar code patterns for coding a multi-byte character.

The bar code structure 6 as shown in FIG. 10 pertains to the general arrangement of bar code patterns generated from a base number code system greater than two which consists of a start pattern 8, a data bar code pattern 9, a checksum 10 and a stop pattern 11. A command code pattern 13 or a command sequence 12 may be inserted between the start 8 and the checksum 10. For single byte characters, a command code pattern 13 is used. For multi-byte characters, a command sequence 12 is used to assign the inputted data to a particular set of desired foreign character, that is, it is used herein to control the Code Page of the characters that represents the codes. The command code sequence consists of a command code pattern 13 and a command word 14. The command word 14 can be assigned any value from 0–255. In this example, as shown in FIG. 11, the command word is assigned a value of 1–4 for the chosen designated ANSI Code Page for the multi-byte character set for Far Eastern countries. This assignment is arbitrary and it is understood that this number assignment can be lengthy if other foreign language character sets are included. The start and stop bar code patterns serve two purposes: they identify a beginning and ending of a code sequence and define the relative reference width of the small, medium and large images. A checksum, a bar code pattern before the stop bar code pattern is used for error detection in the reading of the bar code structure. The checksum used in the base-4 number code system is a modulus 328 of the sum of the assigned value of each bar code pattern, not including the start and stop. The checksum differs according to the number of patterns included in the checksum calculation. A modulus 328 is used in this example because it includes only bar patterns 0–327, the stop and start patterns being excluded. Therefore, as the number of bar patterns differ, the modulus number of the checksum will also differ.

The base-4 number generated data bar code patterns 9 in the bar code structure 6 used for encoding and decoding the character sets generally consists of printable ASCII, non-printable ASCII, high byte patterns (byte values of 128 to 255), and reserved patterns. The bar pattern length which is the same as the total bar pattern width which is the sum of the widths of the bars and spaces in each of these data bar code patterns 9, and the bar code patterns of command, start and stop are summarized in Table 1.

TABLE 1

Summary of the Bar Pattern Length for the Bar Code Patterns

| Group | Description | Bar Pattern Length |
| --- | --- | --- |
| Command | Command pattern | 8 |
| Start/Stop | Start/Stop pattern | 12 |
| Printable ASCII | Byte values from 32 to 126 | 11 |
| Non-Printable ASCII | Byte values from 0 to 31 and 127 | 10 |
| High Byte Patterns | Byte values from 128 to 255 | 12 |
| Reserved | Not used patterns | 9 to 12 |

The selected bar code patterns for the base-4 numbering code system used is listed in FIGS. 1A–1L. As shown, although the total bar pattern length for each group varies, all bar code patterns in each group are represented by an 8-digit base-4 numbers.

When a bar code structure 6 as illustrated in FIG. 10 is scanned, the decoder 5 will convert all bar code patterns including the bar pattern for start, stop, command, command word, and checksum to their base-4 numbers using the same image assignments shown in FIGS. 1A–1L and 2. For a single byte character, there will be only one 8-digit base-4 number but for a multi-byte, there will be at least two 8-digit base-4 number. The different assigned values and functions obtained are fed to the program which communicates the corresponding inputted data at the code system or code page indicated. For example, for Code Page 950, the corresponding traditional Chinese character is shown in FIG. 5A. For Code Page 936, the corresponding simplified Chinese character is shown in FIG. 5B.

Application to Other Base Numbers

A code system using base-4 numbers has 4 designated base numbers ($2^2$), all of which are used in the examples above. For other base number code systems greater than two, for example, base-8 number, there will be eight designated base numbers (0–7). One may use any, a part of, or all of these designated base numbers in the coding process. For generating the bar code patterns, after choosing the designated base numbers to use, each number will be assigned an image and the code length specified. The image assignment may be the same or different from that used in the base-4 number example above. One can arbitrarily apply any selection process for the generated bar code patterns from the base number code system. The selection process need not be ruled based although following the rules proposed herein is preferred. One means is just to pick and choose any non-identical bar code patterns from the set of generated bar code patterns. As in the base-4 numbers, a look-up table is prepared after the bar code patterns are selected. Although any base number greater than two can be used, it is impractical and complex to go beyond a base number of 32.

Bar Code System Implementation

A bar code system implementation is shown in FIGS. 6 and 7. The system implementation generally has a Bar Code Generator System 15 and a Bar Code Decoding System 16. The Bar Code Generator 15 performs the encoding and printing functions. A user inputs the data by means known in the art such as a keyboard for interactive mode, a program in batch processing mode and the like. A program within the Bar Code Generator 15 capable of performing the encoding method described above, provides the byte value of the inputted data. The byte value is processed to an assigned value of a bar code pattern generated from the base number code system greater than two according to a look-up table such as that shown in FIGS. 1A–1L. The assigned value is sent to an encoder 2 to encode the data in either a single byte or a multi-byte. The encoder 2 converts the assigned value to a bar code and sends this to a generator 3 which generates the images or pattern for the printer 4. Examples of printers in the market are laser, ink-jet and thermal printers. Physically, the Bar Code Generator 15 is usually made up of a computer and a printer. Depending on one's system configuration, the program within the encoder 2 and generator 3 may be incorporated with the printer 4 or the program and the encoder 2 may be a part of the computer system within the Bar Generator 15. A Bar Code Decoder 16 reverses the process of the Bar Code Generator. A bar code scanner 7 capable of differentiating a space from a bar image, such as scanning laser beams or handheld wands within the Bar Code Decoder 16, reads or scans the generated bar code pattern. A program within the decoder 5 capable of performing the decoding method described above, translates the scanned bar code patterns to its equivalent designated number within the base number code system, the designated numbers having a decimal equivalent; fetches an assigned value correlating to the decimal equivalent and assigned function; and, communicates the inputted data having the assigned value. Conventional scanners 7 currently used for reading one dimensional bar code patterns can be likewise used for the bar code patterns generated from a base number code system greater than two without requiring any physical or structural modification.

While described herein are the currently preferred embodiments of the invention, those skilled in the art will recognize that other and further modifications may be made without departing from the invention and it is intended to claim all modifications and variations as falling within the scope of the invention.

What is claimed is:

1. A method for generating one dimensional bar code patterns having images of bar and space derived from a base number code system greater than two used for encoding single byte and multi-byte characters, the base number code system having designated base numbers, comprise the steps of:
   a) choosing the base number code system;
   b) picking a code length between eight and sixteen for the chosen base number code system of step a);
   c) generating a designated number for each combination of the designated base number within the chosen base number code system having the chosen code length;
   d) assigning an image having a width measured in unit for each designated base number within the chosen base number code system;
   e) translating each designated base number within the chosen base number code system according to the assigned image of step d) thereby forming a bar code pattern; and,
   f) selecting unambiguously decodable generated bar code patterns.

2. One dimensional bar code patterns generated according to the method of claim 1.

3. The method of claim 1 wherein selecting unambiguously decodable generated bar code patterns comprise the steps of keeping all bar code patterns having images of three units or less; decoding the translated bar code patterns having images of three or less back to the designated numbers within the chosen base number code system using the same image assignment of step d); and, isolating bar code patterns translating back to the generated combination of designated numbers within the chosen bar code system before the translation step e).

4. One dimensional bar code patterns generated according to the method of claim 3.

5. The method of claim 3 further comprising choosing bar code patterns having a total bar pattern length of no more than twelve; selecting bar code patterns starting with a bar and ending with a space; assigning to a start bar code pattern, a bar code having a full width combination of one, two and three; picking a stop bar code pattern starting with a bar and ending with a bar from an unselected set of bar code patterns; designating a command code pattern to a bar code pattern having a total bar or space width of eight; and, assigning a value and a function for each of all selected bar code patterns.

6. One dimensional bar code patterns generated according to the method of claim 5.

7. The method of claim 5 wherein the stop bar code pattern has a total combination of seven bars and spaces and a full width image combination of 1,2 and 3.

8. A method for generating one dimensional bar code patterns having images of bar and space derived from a base-4 number code system used for encoding single byte and multi-byte characters, the base-4 number code system having 0,1,2, and 3 as designated base numbers, comprise the steps of: choosing a code length of eight; generating a designated number for each of all combinations of the base-4 designated numbers having the code length of eight; assigning an image having a width measured in unit for each designated base-4 number, the width of each image corresponding to the number of bars or spaces making up the image to 2 bars for 0, 1 bar for 1, 1 space for 2, 2 spaces for 3, 3 bars for 0,1 and 3 spaces for 3,2; translating each base-4 numbers of a code length of eight according to the assigned image forming a set of bar code patterns; and, selecting unambiguously decodable generated bar code patterns comprising the steps of keeping all bar code patterns having images of three units or less; decoding the translated bar code patterns having images of three or less back to the base-4 designated numbers using the same image assignment; and, isolating bar code patterns translating back to the same base-4 designated numbers before the translation step.

9. One dimensional bar code patterns generated according to the method of claim 8.

10. The method of claim 8 further comprising choosing bar code patterns having a total bar pattern length of no more than twelve; selecting bar code patterns starting with a bar and ending with a space; assigning to a start bar code pattern, a bar code pattern having a full width combination of one, two and three; picking a stop bar code pattern starting with a bar and ending with a bar from an unselected set of bar code patterns; designating a command code pattern to a bar code pattern having a total bar or space width of eight; and, assigning a value and a function for each of all selected bar code patterns.

11. The method of claim 10 wherein the stop bar code pattern has a total combination of seven bars and spaces and a full width combination of 1,2 and 3.

12. One dimensional bar code patterns generated according to the method of claim 10.

13. A method for encoding and decoding single and multibyte characters, comprising the steps of:

for encoding,
preparing a look up table including in correlating columns:
unambiguously decodable bar code patterns derived from a chosen base number code system greater than two obtained by a process of picking a code length between eight and sixteen for the chosen base number code system, generating all combinations of designated numbers within the chosen base number code system having the chosen code length, assigning an image having a width measured in unit for each designated number within the chosen base number code system, translating each designated number within the chosen base number code system according to the assigned image,
designated numbers corresponding to the unambiguously decodable bar code patterns derived from the chosen base number code system greater than two,
decimal equivalent of the designated numbers coding the unambiguously decodable bar code patterns derived from the chosen base number code system greater than two,
assigned values for each unambiguously decodable bar code pattern,
assigned functions for each unambiguously decodable bar code pattern;
inputting a data;
using the look-up table, processing a byte value of the inputted data to an assigned value, correlating the assigned value to an assigned function and a decimal equivalent;
selecting a bar code pattern corresponding to the decimal equivalent of the designated numbers; for decoding
scanning the unambiguously decodable bar code pattern of bars and spaces having a width measured in units;
translating the unambiguously decodable bar code pattern using the chosen image assignment rule used by the encoding method to the designated number of the chosen base number code system, the designated number having a decimal equivalent;
from the look-up table of the encoding method, fetching the assigned value correlating to the decimal equivalent, determining the assigned function from the assigned value; and,
converting the assigned function to a character set.

14. The method of claim 13 wherein the translation for encoding and decoding is done one byte at a time.

15. The method of claim 13 wherein the assigned value is the index for fetching the decimal equivalent of the designated number.

16. The method of claim 13 wherein the assigned value is numerically the same as the byte value of the inputted data for the encoding step or of the scanned bar pattern for the decoding step.

17. The method of claim 13 wherein the encoding step further comprise sending the selected bar code pattern to a generator for printing; and, printing the selected bar code pattern according to a selected code page.

18. The method of claim 13 wherein the width of the scanned images of one unit is a single bar or a single space, the width of two units is a double bar or a double space and the width of three is a double bar followed by a single bar or a double space followed by a single space.

19. A method for encoding and decoding single and multibyte characters, comprising the steps of:
for encoding, preparing a look up table including in correlating columns:
unambiguously decodable bar code patterns derived from a chosen base number code system greater than two obtained by a process of picking a code length between eight and sixteen for the chosen base number code system, generating all combinations of designated numbers within the chosen base number code system having the chosen code length, assigning an image having a width measured in unit for each designated number within the chosen base number code system, keeping all bar code patterns having images of three units or less, decoding the translated bar code patterns having images of three or less back to the designated numbers within the chosen base number code system using the same image assignment for each designated number, isolating bar code patterns translating back to the generated combination of designated numbers within the chosen bar code system, translating each designated number within he chosen base number code system according to the assigned image,
designated numbers corresponding to the unambiguously decodable bar code patterns derived from the chosen base number code system greater than two,
decimal equivalent of the designated numbers coding the unambiguously decodable bar code patterns derived from the chosen base number code system greater than two,
assigned values for each unambiguously decodable bar code pattern,
assigned functions for each unambiguously decodable bar code pattern;
inputting a data;
using the look-up table, processing a byte value of the inputted data to an assigned value, correlating the assigned value to an assigned function and a decimal equivalent;
selecting a bar code pattern corresponding to the decimal equivalent of the designated numbers; for decoding
scanning the unambiguously decodable bar code pattern of bars and spaces having a width measured in units;
translating the unambiguously decodable bar code pattern using the chosen image assignment rule used by the encoding method to the designated number of the chosen base number code system, the designated number having a decimal equivalent;
from the look-up table of the encoding method, fetching the assigned value correlating to the decimal equivalent, determining the assigned function from the assigned value; and,
converting the assigned function to a character set.

20. The method of claim 19 wherein the translation for encoding and decoding is done one byte at a time.

21. The method of claim 19 wherein the assigned value is the index for fetching the decimal equivalent of the designated number.

22. The method of claim 19 wherein the assigned value is numerically the same as the byte value of the inputted data for the encoding step or of the scanned bar pattern for the decoding step.

23. The method of claim 19 wherein the encoding step further comprise sending the selected bar code pattern to a generator for printing; and, printing the selected bar code pattern according to a selected code page.

24. A method for encoding and decoding single and multibyte characters, comprising the steps of:
for encoding,
preparing a look up table including in correlating columns:
unambiguously decodable bar code patterns derived from a chosen base number code system greater than two obtained by a process of picking a code length between eight and sixteen for the chosen base number code system, generating all combinations of designated numbers within the chosen base number code system having the chosen code length, assigning an image having a width measured in unit for each designated number within the chosen base number code system, keeping all bar code patterns having images of three units or less, decoding the translated bar code patterns having images of three or less back to the designated numbers within the chosen base number code system using the same image assignment for each designated number, isolating bar code patterns translating back to the generated combination of designated numbers within the chosen bar code system, translating each designated number within the chosen base number code system according to the assigned image, choosing bar code patterns having a total bar pattern length of no more than twelve, selecting bar code patterns starting with a bar and ending with a space, assigning to a start bar code pattern, a bar code having a full width combination of one, two and three, picking a stop bar code pattern starting with a bar and ending with a bar from an unselected set of bar code patterns, designating a command code pattern to a bar code pattern having a total bar or space width of eight, assigning a value and a function for each of all selected bar code patterns,
designated numbers corresponding to the unambiguously decodable bar code patterns derived from the chosen base number code system greater than two,
decimal equivalent of the designated numbers coding the unambiguously decodable bar code patterns derived from the chosen base number code system greater than two,
assigned values for each unambiguously decodable bar code pattern,
assigned functions for each unambiguously decodable bar code pattern;
inputting a data;
using the look-up table, processing a byte value of the inputted data to an assigned value, correlating the assigned value to an assigned function and a decimal equivalent;
selecting a bar code pattern corresponding to the decimal equivalent of the designated numbers;
for decoding,
scanning the unambiguously decodable bar code pattern of bars and spaces having a width measured in units;
translating the unambiguously decodable bar code pattern using the chosen image assignment rule used by the encoding method to the designated number of the chosen base number code system, the designated number having a decimal equivalent;
from the look-up table of the encoding method, fetching the assigned value correlating to the decimal equivalent, determining the assigned function from the assigned value; and,
converting the assigned function to a character set.

25. The method of claim 24 wherein the translation for encoding and decoding is done one byte at a time.

26. The method of claim 24 wherein the assigned value is the index for fetching the decimal equivalent of the designated number.

27. The method of claim 24 wherein the assigned value is numerically the same as the byte value of the inputted data for the encoding step or of the scanned bar pattern for the decoding step.

28. The method of claim 24 wherein the encoding step further comprise sending the selected bar code pattern to a generator for printing; and, printing the selected bar code pattern according to a selected code page.

29. A method for encoding and decoding single and multibyte characters, comprising the steps of:

for encoding,
  preparing a look up table including in correlating columns;
    unambiguously decodable bar code patterns derived from a base-4 number code system having 0, 1, 2 and 3 as designated numbers with a code length of eight, generating all combinations of designated numbers having the code length of eight, assigning an image having a width measured in unit for each designated number, the width of each image corresponding to the number of bars and spaces making up the image to 2 bars for 0, 1 bar for 1, 1 space for 2, 2 spaces for 3, 3 bars for 0, 1 and 3 spaces for 3, 2, keeping all bar code patterns having images of three units or less, decoding the translated bar code patterns having images of three or less back to the same base-4 designated numbers using the same image assignment for each designated number, isolating bar code patterns translating back to the same combination of base-4 designated numbers, translating each base-4 designated number according to the assigned image,
    designated numbers corresponding to the unambiguously decodable bar code patterns derived from the base-4 number code system,
    decimal equivalent of the designated numbers coding the unambiguously decodable bar code patterns derived from the base-4 number code system,
    assigned values for each unambiguously decodable bar code pattern,
    assigned functions for each unambiguously decodable bar code pattern;
  inputting a data;
  using the look-up table, processing a byte value of the inputted data to an assigned value, correlating the assigned value to an assigned function and a decimal equivalent;
  selecting a bar code pattern corresponding to the decimal equivalent of the designated numbers;
for decoding,
  scanning the unambiguously decodable bar code pattern of bars and spaces having a width measured in units;
  translating the unambiguously decodable bar code pattern using the chosen image assignment rule used by the encoding method to the designated number of the chosen base number code system, the designated number having a decimal equivalent;
  from the look-up table of the encoding method, fetching the assigned value correlating to the decimal equivalent, determining the assigned function from the assigned value; and,
  converting the assigned function to a character set.

30. The method of claim 29 wherein the translation for encoding and decoding is done one byte at a time.

31. The method of claim 29 wherein the assigned value is the index for fetching the decimal equivalent of the base-4 number.

32. The method of claim 29 wherein the assigned value is numerically the same as the byte value of the inputted data for the encoding step or of the scanned bar pattern for the decoding step.

33. The method of claim 29 wherein the encoding step further comprise sending the selected bar code pattern to a generator for printing; and, printing the selected bar code pattern according to a selected code page.

34. A method for encoding and decoding single and multibyte characters, comprising the steps of:

for encoding,
  preparing a look up table including in correlating columns:
    unambiguously decodable bar code patterns derived from a base-4 number code system having 0, 1, 2 and 3 as designated numbers with a code length of eight, generating all combinations of designated numbers having the code length of eight, assigning an image having a width measured in unit for each designated number, the width of each image corresponding to the number of bars and spaces making up the image to 2 bars for 0, 1 bar for 1, 1 space for 2, 2 spaces for 3, 3 bars for 0, 1 and 3 spaces for 3, 2, keeping all bar code patterns having images of three units or less, decoding the translated bar code patterns having images of three or less back to the same base-4 designated numbers using the same image assignment for each designated number, isolating bar code patterns translating back to the same combination of base-4 designated numbers, translating each base-4 designated number according to the assigned image, choosing bar code patterns having a total bar pattern length of no more than twelve, selecting bar code patterns starting with a bar and ending with a space, assigning to a start bar code pattern, a bar code having a full width combination of one, two and three, picking a stop bar code pattern starting with a bar and ending with a bar from a unselected set of bar code patterns, designating a command code pattern to a bar code pattern having a total bar or space width of eight, assigning a value and a function for each of all selected bar code patterns,
    designated numbers corresponding to the unambiguously decodable bar code patterns derived from the base-4 number code system,
    decimal equivalent of the designated numbers coding the unambiguously decodable bar code patterns derived from the base-4 number code system,
    assigned values for each unambiguously decodable bar code pattern,
    assigned functions for each unambiguously decodable bar code pattern;
  inputting a data;
  using the look-up table, processing a byte value of the inputted data to an assigned value, correlating the assigned value to an assigned function and a decimal equivalent;

selecting a bar code pattern corresponding to the decimal equivalent of the designated numbers;

for decoding, scanning the unambiguously decodable bar code pattern of bars and spaces having a width measured in units;

translating the unambiguously decodable bar code pattern using the chosen image assignment rule used by the encoding method to the designated number of the chosen base number code system, the designated number having a decimal equivalent;

from the look-up table of the encoding method, fetching the assigned value correlating to the decimal equivalent, determining the assigned function from the assigned value; and, converting the assigned function to a character set.

35. The method of claim 34 wherein the translation for encoding and decoding is done one byte at a time.

36. The method of claim 34 wherein the assigned value is the index for fetching the decimal equivalent of the base-4 number.

37. The method of claim 34 wherein the assigned value is numerically the same as the byte value of the inputted data for the encoding step or of the scanned bar pattern for the decoding step.

38. The method of claim 34 wherein the encoding step further comprise sending the selected bar code pattern to a generator for printing; and, printing the selected bar code pattern according to a selected code page.

* * * * *